US011722388B2

(12) United States Patent
 Maseedu

(10) Patent No.: US 11,722,388 B2
(45) Date of Patent: *Aug. 8, 2023

(54) WEB INTERFACE TO REMOTELY COLLECT AND ANALYZE MOBILE DEVICE LOGS

(71) Applicant: T-Mobile USA, Inc., Bellevue, WA (US)

(72) Inventor: Phaneendra Maseedu, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,103

(22) Filed: Sep. 23, 2022

(65) Prior Publication Data
US 2023/0021250 A1    Jan. 19, 2023

Related U.S. Application Data

(63) Continuation of application No. 17/503,027, filed on Oct. 15, 2021, now Pat. No. 11,489,742, which is a
(Continued)

(51) Int. Cl.
*G06F 15/173* (2006.01)
*G06F 15/16* (2006.01)
(Continued)

(52) U.S. Cl.
CPC .......... *H04L 43/06* (2013.01); *H04B 17/318* (2015.01); *H04L 41/0686* (2013.01);
(Continued)

(58) Field of Classification Search
CPC ..... H04L 43/06; H04L 43/16; H04L 41/0686; H04L 67/025; H04L 67/12; H04W 24/08; H04W 24/06; H04B 17/318
(Continued)

(56) References Cited

U.S. PATENT DOCUMENTS 6,393,305 B1    5/2002 Ulvinen et al.
6,434,399 B1    8/2002 Kamperschroer
(Continued)

FOREIGN PATENT DOCUMENTS

CN    105007590 A  * 10/2015

OTHER PUBLICATIONS

Unknown, "What Is 5G?" Apr. 2020, Cisco, https://web.archive.org/web/20200430024522/https://www.cisco.com/c/en/us/solutions/what-is-5g.html (Year: 2020).*

*Primary Examiner* — Ruolei Zong
(74) *Attorney, Agent, or Firm* — Perkins Coie LLP

(57) ABSTRACT

The disclosed system remotely tests performance of a wireless telecommunication network. The system sends an instruction to a device to interact with the wireless telecommunication network. The system can obtain a log generated by a wireless communication chip of the mobile device, where the log indicates attributes of the communication using the wireless telecommunication network, such as a frequency and a signal strength associated with the frequency. Based on the log generated by the wireless communication chip of the mobile device, the system can determine the performance of the wireless telecommunication network without obtaining a second log generated by a second device, such as an eNodeB, involved in enabling the communication through the wireless telecommunication network. Upon determining that the performance of the wireless telecommunication network is below a predetermined threshold, the system can send a notification indicating the problematic performance.

18 Claims, 5 Drawing Sheets

Related U.S. Application Data continuation of application No. 17/022,050, filed on Sep. 15, 2020, now Pat. No. 11,178,028.

(51) Int. Cl.
| | |
|---|---|
| *H04L 43/06* | (2022.01) |
| *H04L 67/025* | (2022.01) |
| *H04L 43/16* | (2022.01) |
| *H04W 24/06* | (2009.01) |
| *H04L 41/0686* | (2022.01) |
| *H04L 67/12* | (2022.01) |
| *H04B 17/318* | (2015.01) |
| *H04W 24/08* | (2009.01) |

(52) U.S. Cl.
CPC ............ *H04L 43/16* (2013.01); *H04L 67/025* (2013.01); *H04L 67/12* (2013.01); *H04W 24/06* (2013.01); *H04W 24/08* (2013.01)

(58) Field of Classification Search
USPC ........................................................ 709/224
See application file for complete search history.

(56) References Cited

U.S. PATENT DOCUMENTS

| | | | |
|---|---|---|---|
| 6,463,287 B1 | 10/2002 | Wegner | |
| 7,715,873 B1 | 5/2010 | Biere et al. | |
| 8,340,710 B2 | 12/2012 | Gupta | |
| 8,380,858 B2 | 2/2013 | Froelich | |
| 8,699,390 B2 | 4/2014 | Norris | |
| 8,804,544 B2 | 8/2014 | Linkola et al. | |
| 9,125,094 B2 | 9/2015 | Wu | |
| 9,168,893 B1* | 10/2015 | Schwartz | B60R 25/04 |
| 9,338,651 B2 | 5/2016 | Tatavarty et al. | |
| 9,386,464 B2 | 7/2016 | Wong | |
| 9,439,166 B2 | 9/2016 | Siomina et al. | |
| 9,585,037 B1* | 2/2017 | Davari | H04W 24/08 |
| 9,603,008 B2 | 3/2017 | Kazmi et al. | |
| 9,781,609 B1 | 10/2017 | Kurtz et al. | |
| 9,826,453 B2 | 11/2017 | Linkola et al. | |
| 9,924,386 B2 | 3/2018 | Jain et al. | |
| 10,187,180 B2 | 1/2019 | Sorrentino et al. | |
| 10,268,627 B2 | 4/2019 | Schnell et al. | |
| 10,375,591 B2* | 8/2019 | Ketonen | H04L 41/5019 |
| 10,469,602 B2 | 11/2019 | Rimhagen et al. | |
| 10,739,769 B2 | 8/2020 | Dean et al. | |
| 10,939,312 B2 | 3/2021 | Wangler et al. | |
| 11,178,028 B1 | 11/2021 | Maseedu | |
| 2002/0191635 A1 | 12/2002 | Chow et al. | |
| 2003/0030681 A1 | 2/2003 | Vigil et al. | |
| 2004/0097260 A1 | 5/2004 | Stenton et al. | |
| 2004/0203888 A1 | 10/2004 | Mikan | |
| 2004/0203897 A1* | 10/2004 | Rogers | H04W 16/18 455/446 |
| 2004/0204063 A1 | 10/2004 | Van | |
| 2005/0101329 A1 | 5/2005 | Gallagher | |
| 2005/0159153 A1 | 7/2005 | Mousseau et al. | |
| 2005/0197101 A1 | 9/2005 | Gupta | |
| 2007/0284474 A1 | 12/2007 | Olson et al. | |
| 2011/0196571 A1 | 8/2011 | Foladare et al. | |
| 2011/0211526 A1 | 9/2011 | Norris | |
| 2012/0190364 A1 | 7/2012 | Wu | |
| 2014/0071942 A1 | 3/2014 | Ye | |
| 2014/0106677 A1 | 4/2014 | Altman | |
| 2014/0293829 A1* | 10/2014 | Visuri | H04W 64/003 370/254 |
| 2014/0313888 A1 | 10/2014 | Linkola et al. | |
| 2015/0208230 A1 | 7/2015 | Kazmi et al. | |
| 2020/0245168 A1* | 7/2020 | Ketonen | H04L 43/55 |

\* cited by examiner

WEB INTERFACE TO REMOTELY COLLECT AND ANALYZE MOBILE DEVICE LOGS

CROSS-REFERENCE TO RELATED APPLICATION

This application is a continuation of U.S. patent application Ser. No. 17/503,027, filed Oct. 15, 2021, entitled WEB INTERFACE TO REMOTELY COLLECT AND ANALYZE MOBILE DEVICE LOGS, which is a continuation of U.S. patent application Ser. No. 17/022,050, filed Sep. 15, 2020, entitled WEB INTERFACE TO REMOTELY COLLECT AND ANALYZE MOBILE DEVICE LOGS, which is hereby incorporated by reference in its entirety.

BACKGROUND

A wireless telecommunications network is a group of nodes interconnected by links that are used to exchange messages between the nodes. The links can use a variety of technologies based on the methodologies of circuit switching, message switching, or packet switching, to pass messages and signals. The wireless telecommunication networks can contain billions of nodes such as mobile devices, antennas, cell towers, routers, domain name servers, etc. Given the complexity of the wireless telecommunication network, testing the performance of the network or determining how a change to the network will affect the performance of the network is difficult.

DETAILED DESCRIPTION

The disclosed system remotely tests performance of a wireless telecommunication network. A processor associated with the system can send an instruction to a device, such as a mobile device or an Internet of Things (IOT) device, to interact with the wireless telecommunication network, such as initiating or receiving a communication through the wireless telecommunication network. The communication can be a call or a data plan communication, such as a text message. A user can control the processor using a browser interface, and thus the user can remotely control the interaction between the mobile device and the wireless telecommunication network. The processor can obtain a log generated by a wireless communication chip of the mobile device, where the log indicates attributes of the communication using the wireless telecommunication network, such as a frequency and a signal strength associated with the frequency of the air interface.

Based on the log generated by the wireless communication chip of the mobile device, the processor can remotely determine the performance of the wireless telecommunication network without obtaining a second log generated by a second device, such as an eNodeB, involved in enabling the communication through the wireless telecommunication network. Upon determining that the performance of the wireless telecommunication network is below a predetermined threshold, the processor can send a notification indicating the problematic performance.

The user can survey the performance of the wireless telecommunication network over an area by remotely controlling, using the browser interface, multiple mobile devices mounted on a vehicle configured to traverse the area. The processor can obtain logs generated by wireless communication chips associated with multiple devices, convert the logs to text logs, and select features of interest in the text logs using a string processing language, such as Perl or Python scripting.

Figure 1:
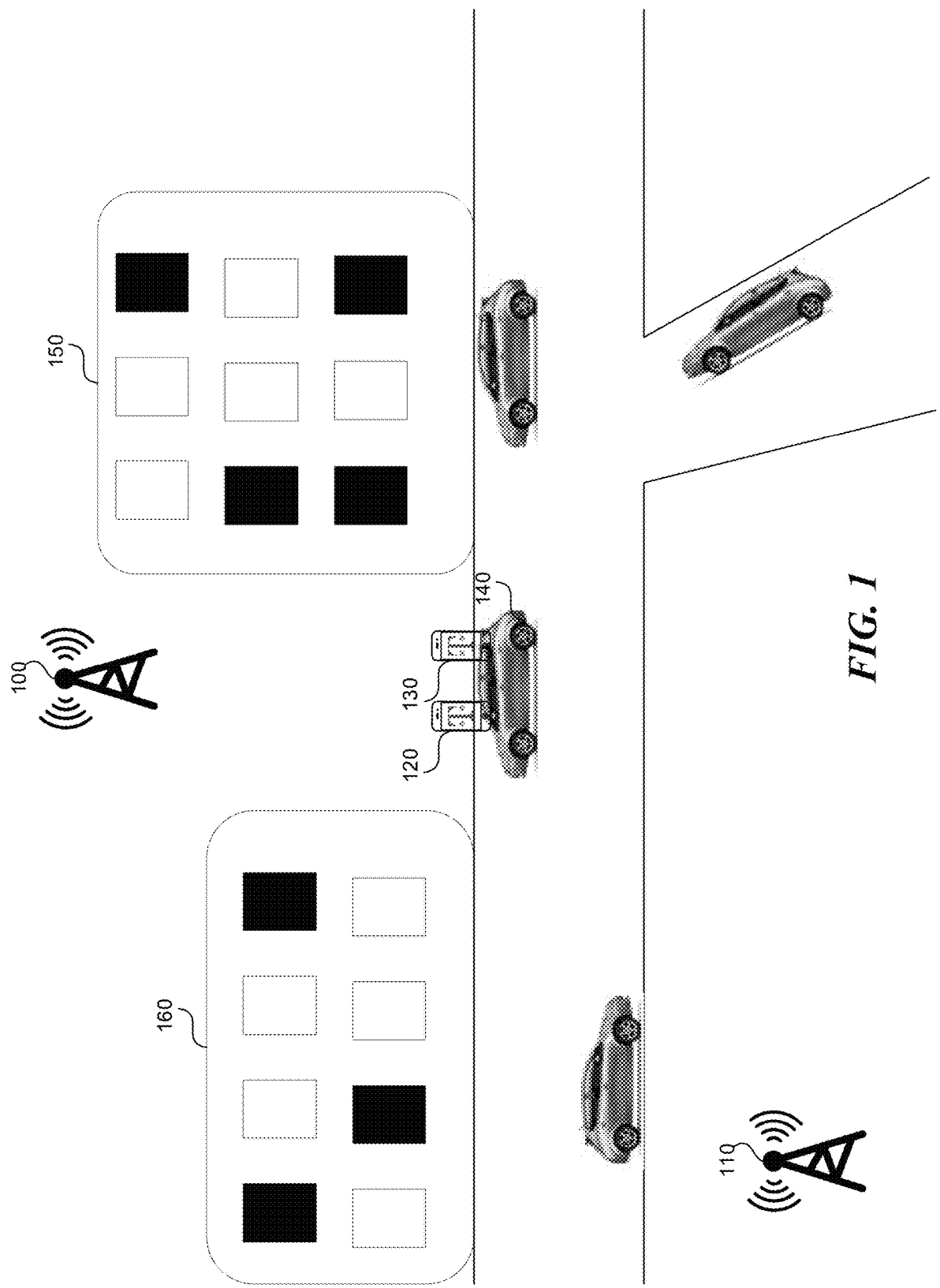
FIG. 1 shows a vehicle expert with multiple user equipment (UE) testing the performance of a wireless telecommunication network.

FIG. 1 shows a vehicle equipped with multiple user equipment (UE) devices for testing the performance of a wireless telecommunication network. The wireless telecommunication network can include multiple cell towers 100, 110 providing coverage over a geographical area. The cell towers 100, 110, for example, eNodeBs, can provide wireless coverage to UE 120, 130, such as cell phones, cell enabled vehicles, IOT devices, tablets, personal digital assistants, smart watches, etc. The cell towers 100, 110 can provide 2G, 3G, 4G, 5G, etc. coverage to the UE.

The quality of the wireless coverage can vary with varying interfering objects 150, 160 such as buildings, other cars, and distance to the UE 120, 130. In addition, changes to the wireless telecommunication network such as software updates, configuration changes to the cell towers 100, 110, or other elements of the wireless telecommunication network can cause problems and/or performance changes that can be measured prior to deployment, or after deployment. The vehicle 140 measuring the wireless telecommunication network can detect problems and/or performance changes in the wireless telecommunication network and request a fix of the problems and/or performance degradation prior to deploying the changes to the wireless telecommunication network.

The vehicle 140, such as a minivan, can carry numerous UEs 120, 130, such as hundreds or thousands of UEs. The vehicle 140 can drive around a geographical area to monitor wireless signals provided by the wireless telecommunication network and gather the information in a log. The log can contain information about the wireless telecommunication network such as the strength of a wireless signal at various frequencies and at various geographic locations, quality of handoffs, number of call drops, bandwidth of the network, voice quality, etc.

The system disclosed in this application can automatically collect the logs, analyze them, and identify any problematic geographic areas, cell towers, sectors, and/or antennas. Further, due to the number of the devices carried on the vehicle 140, and the amount of data gathered by those devices, the performance of the wireless telecommunication network can be accurately measured. For example, multiple UE 120, 130 can record data from a single cell tower, and any measurement errors associated with a single UE 120 will not propagate to the measurements recorded by the other UEs 130. As a result, problems associated with a UE 120 can be distinguished from the problems associated with the telecommunication network, and measurement errors associated with a single UE 120 do not cause a conclusion that the cell towers 100, 110 are the source of the errors.

The vehicle 140 can be an autonomous vehicle. The vehicle 140 can be remotely controlled and instructed to go to a particular geographic area, such as a geographic area where the wireless telecommunication network is having problems, to gather measurements about the wireless telecommunication network.

Previously, measuring the performance of the wireless telecommunication network required significant manual labor and could not scale to the hundreds of UEs 120, 130. For example, a human operator had to carry a laptop along with the UE 120, 130, to download the logs from the UEs. The laptop could connect to up to four UEs 120, 130 through the USB ports, and the operator had to manually download the logs from the UEs 120, 130 to the laptop. By contrast, the present invention enables downloading of thousands of logs from thousands of devices automatically.

Figure 2:
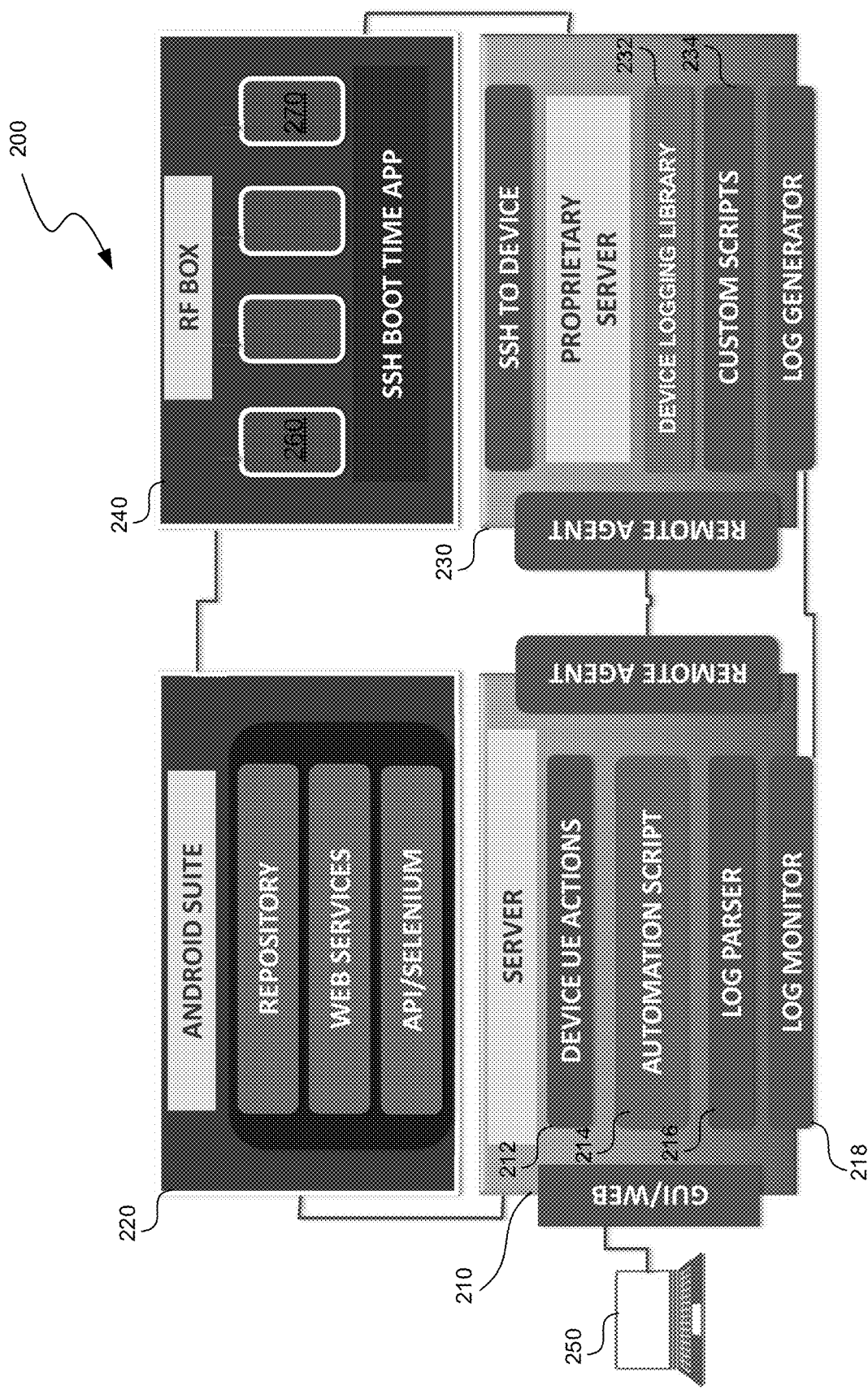
FIG. 2 shows a system for remotely controlling a UE testing the performance of a wireless telecommunication network.

FIG. 2 shows a system for remotely controlling a UE testing the performance of a wireless telecommunication network. The system 200 includes an automation server 210, an Android suite 220, a decoding server 230, and a radiofrequency (RF) box 240.

A user operating a computing device 250, such as a laptop, can issue commands to the system 200 and remotely control the automation server 210, the Android suite 220, the decoding server 230, and the RF box 240. The user can control the system 200 through a webpage, as explained in FIG. 3.

The automation server 210 receives instructions from the computing device 250 on what kind of tests to perform. The automation server 210 then translates the instructions received from the computing device 250 into appropriate instructions to send to the Android suite 220 and/or the decoding server 230. Specifically, the device UE actions module 212 of the automation server 210 can translate the received instructions into actions to be performed by UEs 260, 270, while the automation script 214 can translate the received instructions into actions to be performed by the decoding server 230.

For example, the computing device 250 can issue instructions to place a call from UE 260 to another device. The device UE actions module 212 of the automation server 210 can translate the instruction into an instruction to the Android suite 220 to place a call, and the automation script 214 can translate the received instruction into an instruction to the decoding server 230 to initiate log collection at the UEs 260, 270 in the RF box 240.

In another example, the computing device 250 can issue an instruction to terminate the call at the UE 260. The device UE actions module 212 of the automation server 210 can translate the instruction into an instruction to the Android suite 220 to terminate a call, and the automation script 214 can translate the received instruction into an instruction to the decoding server 230 to stop log collection at the UEs 260, 270 in the RF box 240.

The automation server 210 does not need to recover logs from other devices in the network, such as cell towers 100, 110 in FIG. 1 or eNodeB to determine the performance of the telecommunication network and/or whether the telecommunication network has passed the test. The automation server 210 can solely rely on the logs generated by the UEs 260, 270.

The Android suite 220 can control the UE 260, 270 (only two labeled for brevity) actions. For example, the Android suite 220 can instruct the UE 260 to dial a specific number, initiate a call, and after a while terminate the call. The Android suite 220 can operate on a cloud computer and communicate the commands to the RF box 240 by a wireless connection.

The Android suite 220 can use cell towers 100, 110 in FIG. 1 to send a several wireless control signals to the UEs 260, 270, while the UEs 260, 270 are engaged in a call. The Android suite 220 can vary the frequency and the strength of the signals sent to the UEs 260, 270 to simulate whether the UE is closer to the cell tower 100, 110, away from the cell tower, inside a home or outside, in a tall building, in an area with good coverage such as downtown, or in an area with poor coverage such as a basement. For example, in a controlled testing environment such as a lab, to test the wireless telecommunication network, the automation server 210 can send one low strength signal and can increase the strength of the low strength signal to a good strength signal to test whether the device is able to receive the signal and respond to the signal, without dropping the call. In another example, in a production network set up, to test the wireless telecommunication network, the vehicle carrying the RF box 240 can vary the strength of the signal from low strength to good strength and vice versa by driving away or toward the cell tower 100, 110. Consequently, the RF box 240 can test whether the device 260, 270 is able to receive the signal and respond to the signal without dropping the call.

The RF box 240 is a collection of the UEs 260, 270, such as a mobile phone or an IOT device. The UEs can receive instructions from the Android suite 220 and perform corresponding actions, such as placing calls, accessing webpages, running applications installed on the UEs, etc. The UEs 260, 270 can be mounted in the vehicle 140 in FIG. 1 and traverse a geographic area while testing the performance of the UEs 260, 270 and the wireless communication network to which the UEs 260, 270 are connected. The UEs 260, 270 can perform actions that a user can perform, such as opening and unlocking the UE 260, 270, accessing a webpage, placing a call, sending a text message, running an application, etc. The UEs 260, 270 can store log information about the actions performed on the UE in a log file stored on the UE. The log file can record events in all of the radio stack layers, such as the layer 3-Network Layer, layer 2-Data Link Layer and/or layer 1-Physical Layer.

The log file, such as QMDL file, can be in a chipset specific format and can be generated by the device chipset, such as a Qualcomm chipset. A QMDL file is a Qualcomm Extensible Diagnostic Monitor Log.

Decoding server 230 can receive the instruction from the automation server 210 and translate to an instruction that the UEs 260, 270 can understand and execute. For example, the instruction can be to start creating the logs at UEs 260, 270, to retrieve the created logs from the UEs, or to stop creating the logs. To communicate with the UEs 260, 270, the decoding server 230 can create a secure shell (SSH) connection, which preserves the confidentiality of the data exchanged by using encryption and decryption to communicate between the decoding server 230 and the UEs 260, 270.

The decoding server 230 can be a QCAT server, which is an integrated software package that acts as log translation server and allows decoding of device logs generated in the QMDL format. The decoding server 230 can have a translator 232 to translate the logs from the machine-readable format into a human readable format. In addition, the decoding server 230 can also contain custom scripts 234, such as Perl or Python scripts, that can perform further filtering of the logs, such as retrieving specific layer messages of the radio stack.

The decoding server 230 can pass the translated and filtered logs to the automation server 210. The log parser 216 and the log monitor 218 can further analyze the logs to determine whether any problems are present in the wireless telecommunication network. The log parser 216 and the log monitor 218 can verify the messages conform to the release specification standards.

Figure 3:
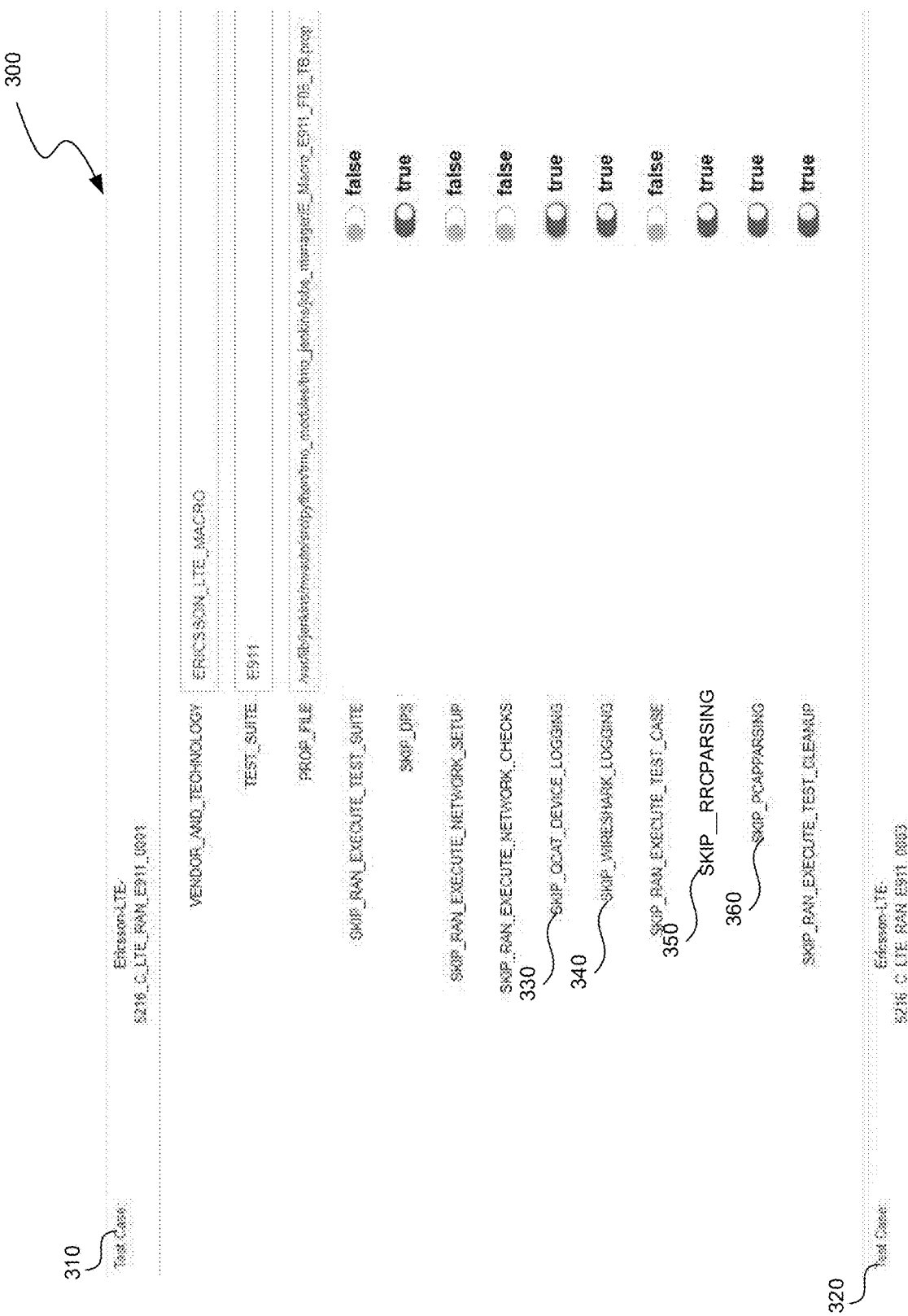
FIG. 3 is a user interface of the web application enabling automatic testing of the wireless telecommunication network, and will generally be understandable by one of ordinary skill in the relevant art based on the disclosure herein.

FIG. 3 is a user interface of the web application enabling automatic testing of the wireless telecommunication network, and will generally be understandable by one of ordinary skill in the relevant art based on the disclosure herein. The computing device 250 in FIG. 2 can present the user interface 300 to a user. The user interface 300 can enable the user to control the automatic testing of the wireless telecommunication network.

The computing device 250 can enable the user to create and select multiple tests 310, 320 to run on the wireless telecommunication network. Once created, the computing device 250 can store the multiple tests 310, 320 for later retrieval.

Test 310 is created for testing an Ericsson LTE phone. The tests 310, 320 can further be modified through controls 330, 340, 350, 360 (only four labeled for brevity), which enable modification of a stored test.

For example, setting the control 330 to true enables the UEs 260, 270 to skip device logging. Setting the control 340 to true enables the system 200 to skip Wireshark logging. Wireshark is a packet analyzer used for network troubleshooting, analysis, and software and communications protocol development.

Setting the control 350 to true enables the system 200 to skip parsing of the Radio Resource Control (RRC) packets. The RRC protocol is used in UMTS and LTE on the Air interface. It is a layer that exists between UE 260, 270 and eNodeB 100, 110 and exists at the IP level (layer 3-Network Layer). RRC messages are transported via the PDCP-Protocol. The major functions of the RRC protocol include connection establishment and release functions, broadcast of system information, radio bearer establishment, reconfiguration and release, RRC connection mobility procedures, paging notification and release, and outer loop power control.

Setting the control 360 to true enables the system 200 to skip parsing of the network or interface PCAP files. The ".pcap" file extension is mainly associated with Wireshark, a program used for analyzing networks. Files with the extension ".pcap" are data files created using the program, and they contain the packet data of a network. These files are mainly used in analyzing the network characteristics of a certain data.

Figure 4:
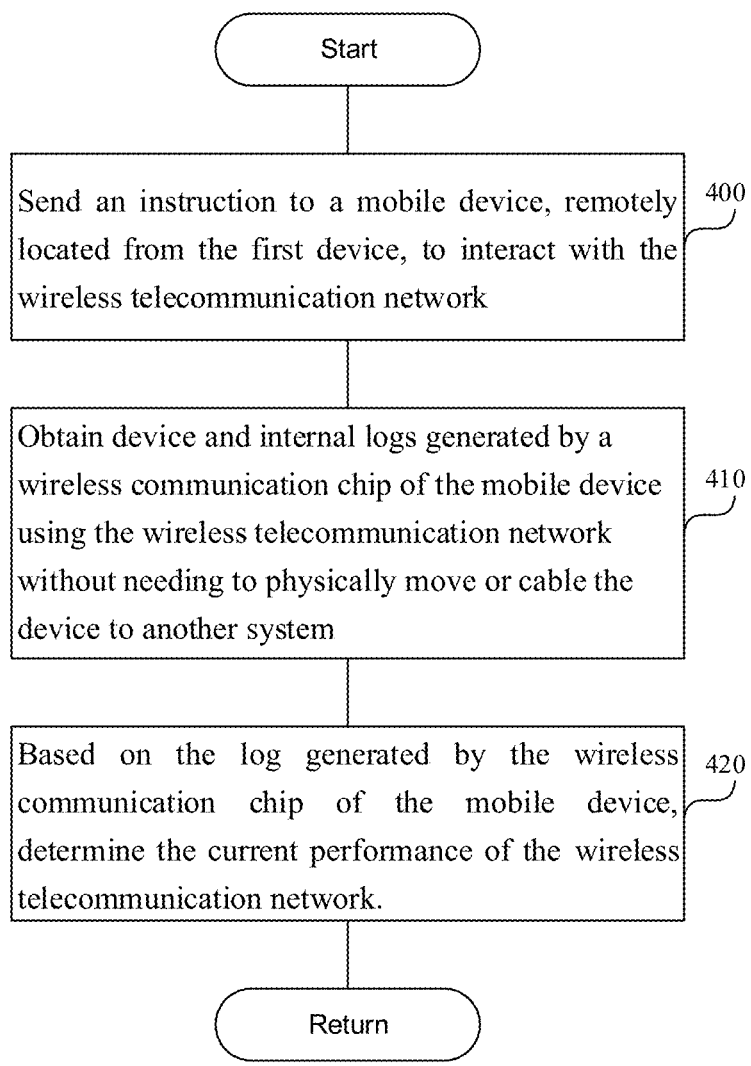
FIG. 4 is a flowchart of a method to remotely test a performance of a wireless telecommunication network.

FIG. 4 is a flowchart of a method to remotely test a performance of a wireless telecommunication network. In step 400, a hardware or software processor executing instructions described in this application can send, using a browser interface displayed on a first device, an instruction to a mobile device, remotely located from the first device, to interact with the wireless telecommunication network. The instruction can include initiating or receiving a communication through the wireless telecommunication network, such as placing a call, sending a text, accessing the website, starting an application, etc.

In step 410, the processor can remotely and wirelessly obtain device and internal logs generated by a wireless communication chip of the mobile device using the wireless telecommunication network. The processor can obtain the logs remotely and wirelessly without needing to physically move or cable the device to another system. Consequently, a large number of logs, such as hundreds of thousands of logs, can be gathered, and large areas of the network can be tested, such as hundreds of square miles, in approximately the same amount of time during which, previously, only tens of logs and only several square miles of the network were tested. The log can indicate attributes of the communication using the wireless telecommunication network. The attributes can include a frequency and a signal strength associated with the frequency received by the mobile device, a time the communication was received and replaced, the duration of the communication, etc.

In step 420, based on the log generated by the wireless communication chip of the mobile device, the processor can determine the current performance of the wireless telecommunication network remotely, without physically moving or cabling the mobile device to another system, and without necessarily obtaining a second log generated by a second device associated with the wireless telecommunication network, such as a second device involved in enabling the communication through the wireless telecommunication network. The second device can be in same or another wireless network.

For example, in contrast to the system disclosed in this application, other systems can determine the performance of the wireless telecommunication network by gathering logs from various devices associated with the wireless telecommunication networks such as eNodeB, Mobility Management Entity (MME), serving gateway, packet Data Network Gateway (PDN Gateway), device implementing Authentication Server Function (AUSF), device implementing Access and Mobility Management Function (AMF), etc. The other systems, once they gather the logs from these various devices, have to correlate the logs from the various devices to create a call trace record, which can be a time-consuming task. Furthermore, whenever a configuration of a device within the wireless telecommunication network changes, there is a software update, and the other systems have to be upgraded to incorporate the configuration change or software update.

By contrast, the system presented in this application can access a log associated with a single wireless communication chip, such as a Qualcomm chip, of a UE, which can store events recorded at the UE, without the need to access logs for multiple devices, and can reconstruct a call trace record. The log can record events occurring in various radio stack layers, such as the layer 3-Network Layer, layer 2-Data Link Layer and/or layer 1-Physical Layer.

The log can be in format not readable to humans, such as QMDL format. The unreadable format can be converted to a text format using a device logging library, such as a QCAT library. The system disclosed in the present application needs a one-time password (OTP) to access the log file on the UE. A software update or a reconfiguration of a device associated with the wireless telecommunication network does not affect the system presented in this application because the log files are not affected by the changes external to the wireless communication chip of the UE.

The processor can convert the log generated by the wireless communication chip to a text format by using a device logging library, such as the QCAT library, to convert the unreadable log file into a text format. Based on the text format, the processor can determine the performance of the wireless telecommunication network. Upon determining that the performance of the wireless telecommunication network is below a predetermined threshold, the processor can send a notification indicating the problematic performance.

The processor can obtain multiple logs generated by multiple wireless communication chips associated with multiple devices connected to the wireless telecommunication network. The processor can convert the multiple logs generated by the multiple wireless communication chips to multiple text logs and select features of interest in the multiple text logs using string processing.

For example, once the log is converted to the text format, the log in the text format can be processed by other scripts and/or software, such as Perl or Python scripts, performing protocol parsing operations to isolate parameters of interest such as a time a communication occurred, length of communication, protocol type, etc.

The processor can survey the performance of the wireless telecommunication network over a geographic area by remotely controlling, using the browser interface displayed on the first device, multiple mobile devices mounted on a vehicle configured to traverse the area. For example, the processor can remotely control the vehicle carrying the multiple mobile devices and direct the vehicle to go to particular geographic areas to measure the performance of the wireless telecommunication network in the particular geographic area. The vehicle can be a self-driving vehicle that can receive route instructions from the processor.

Computer

Figure 5:
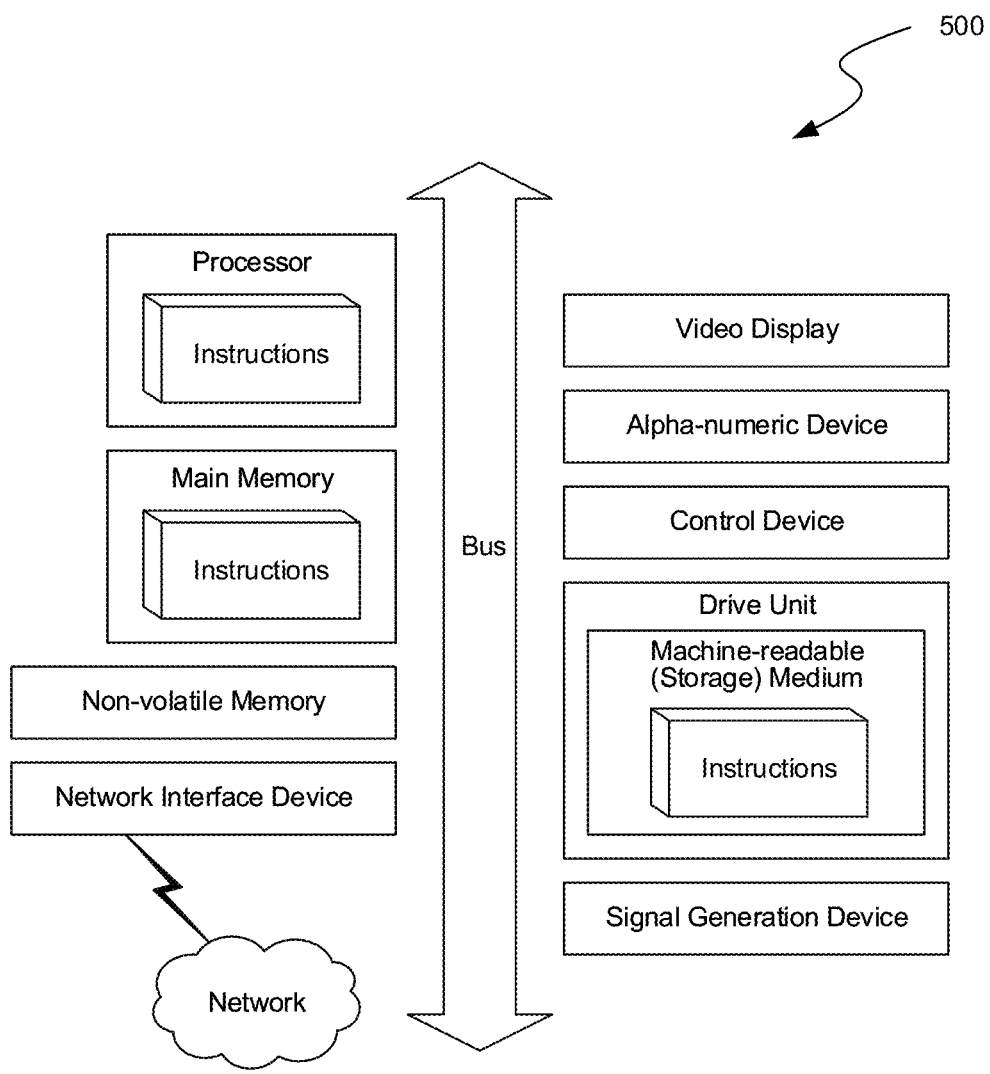
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can perform the instructions disclosed in the application, for example instructions disclosed in FIG. 4. The processor of the computer system 500 can be associated with the UE 120, 130 in FIG. 1; with telecommunication network nodes, such as the cell towers 100, 110 in FIG. 1; with the vehicle 140 in FIG. 1; and/or with the computing device 250 in FIG. 2, the automation server 210 in FIG. 2, the Android suite 220 in FIG. 2, the decoding server 230 in FIG. 2, and/or the RF box 240 in FIG. 2. The main memory, the non-volatile memory and/or the drive unit of the computer system 500 can store the instructions executed by the processor of the computer system 500. The network of the computer system 500 can be the network used to communicate between the various elements of the system such as the telecommunication nodes 100, 110 and UEs 120, 130, the Android suite 220 and the RF box 240, the Android suite 220 and the automation server 210, the automation server 210 and the decoding server 230, the decoding server 230 and the RF box 240, etc.

This disclosure contemplates the computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one non-transitory computer-readable storage medium storing instructions for testing a 5G or higher generation wireless telecommunication network which, when executed by at least one data processor of a system, causes the system to perform operations, comprising:

sending, using a browser interface displayed on a first device, an instruction to multiple mobile devices at a vehicle,
 wherein the vehicle is configured to travel within a geographic area;
remotely controlling the multiple mobile devices at the vehicle through the instruction issued by the first device,
 wherein the first device is located remotely from the multiple mobile devices at the vehicle and is configured to control the multiple mobile devices through the browser interface;
wirelessly obtaining at least one log generated by a mobile device among the multiple mobile devices using the 5G or higher generation wireless telecommunication network; and
based on the log generated by the first device, remotely determining performance of the 5G or higher generation wireless telecommunication network.

2. The non-transitory computer-readable storage medium of claim 1, further comprising:
 upon determining that the performance of the 5G or higher generation wireless telecommunication network is below a predetermined threshold, sending a notification indicating a problematic performance.

3. The non-transitory computer-readable storage medium of claim 1, wherein the vehicle is an autonomous vehicle.

4. The non-transitory computer-readable storage medium of claim 1, further comprising:
 converting the log generated by the first device to a human readable text format; and
 based on the human readable text format, determining the performance of the 5G or higher generation wireless telecommunication network.

5. The non-transitory computer-readable storage medium of claim 1, further comprising:
 obtaining multiple logs generated by the multiple devices connected to the 5G or higher generation wireless telecommunication network;
 converting the multiple logs to multiple text logs; and
 selecting features of interest in the multiple text logs using string processing.

6. The non-transitory computer-readable storage medium of claim 1, wherein the log is recorded in a chipset specific format.

7. The non-transitory computer-readable storage medium of claim 1, wherein the log indicates attributes of communications using the 5G or higher generation wireless telecommunication network, and wherein the attributes include a frequency and a signal strength associated with the frequency.

8. A system for testing a 5G or higher generation wireless telecommunication network, the system comprising:
 at least one hardware processor; and,
 at least one data storage medium, coupled to the processor, and storing instructions to:
  send, using a browser interface displayed on a first device, an instruction to multiple mobile devices at a vehicle,
   wherein the vehicle is configured to travel within a geographic area;
  remotely control the multiple mobile devices at the vehicle through the instruction issued by the first device,
   wherein the first device is located remotely from the multiple mobile devices at the vehicle and is configured to control the multiple mobile devices through the browser interface;
  wirelessly obtain at least one log generated by a mobile device among the multiple mobile devices using the 5G or higher generation wireless telecommunication network; and
  based on the log generated by the first device, remotely determine performance of the 5G or higher generation wireless telecommunication network.

9. The system of claim 8, further comprising instructions to:
 upon determining that the performance of the 5G or higher generation wireless telecommunication network is below a predetermined threshold, sending a notification indicating a problematic performance.

10. The system of claim 8, wherein the vehicle is an autonomous vehicle.

11. The system of claim 8, further comprising instructions to:
 converting the log generated by the first device to a human readable text format; and
 based on the human readable text format, determining the performance of the 5G or higher generation wireless telecommunication network.

12. The system of claim 8, further comprising instructions to:
 obtaining multiple logs generated by the multiple devices connected to the 5G or higher generation wireless telecommunication network;
 converting the multiple logs to multiple text logs; and
 selecting features of interest in the multiple text logs using string processing.

13. The system of claim 8, wherein the log is recorded in a chipset specific format.

14. The system of claim 8, wherein the log indicates attributes of communications using the 5G or higher generation wireless telecommunication network, and wherein the attributes include a frequency and a signal strength associated with the frequency.

15. A method to remotely test performance of a 5G or higher generation wireless telecommunication network, the method comprising:
 sending an instruction to a device to wirelessly communicate with the 5G or higher generation wireless telecommunication network,
  wherein the device is a mobile device or an Internet of Things (IOT) device,
  wherein the communication is a data plan communication, and wherein the data plan communication includes a text message;
 controlling the device remotely using a browser interface to permit a user to remotely control interaction between the device and the 5G or higher generation wireless telecommunication network;
 obtaining a log generated by the device, wherein the log indicates attributes of the communication using the 5G or higher generation wireless telecommunication network; and,
 based on the log generated by the device, remotely determine performance of the 5G or higher generation wireless telecommunication network without obtaining a second log generated by an eNodeB involved in enabling the communication through the 5G or higher generation wireless telecommunication network.

16. The method of claim 15, further comprising:
 upon determining that the performance of the 5G or higher generation wireless telecommunication network is below a predetermined threshold, sending a notification indicating problematic performance.

17. The method of claim 15, further comprising:
obtaining logs from with multiple devices;
converting the logs to text logs; and
selecting features of interest in the text logs using Perl or Python scripting.

18. The method of claim 15, further comprising:
wherein the log indicates attributes including a frequency and a signal strength associated with a frequency of an air interface between the device and the 5G or higher generation wireless telecommunication network.

\* \* \* \* \*